Figure 1:
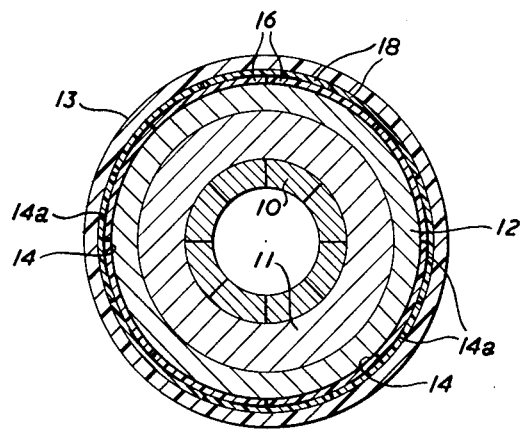

May 30, 1961  H. D. SHORT  2,986,486
COMPOSITE PLASTIC PROTECTIVE COVERING FOR POWER CABLES
Filed Sept. 3, 1959  2 Sheets-Sheet 1

INVENTOR
H. D. SHORT
BY Maybee & Legris
ATTORNEYS

May 30, 1961  H. D. SHORT  2,986,486
COMPOSITE PLASTIC PROTECTIVE COVERING FOR POWER CABLES
Filed Sept. 3, 1959 2 Sheets-Sheet 2

INVENTOR
H. D. SHORT

BY Maybee ; Legris
ATTORNEYS

United States Patent Office 2,986,486
Patented May 30, 1961

2,986,486
COMPOSITE PLASTIC PROTECTIVE COVERING FOR POWER CABLES
Herbert Douglass Short, Toronto, Ontario, Canada, assignor to Canada Wire and Cable Company Limited, Toronto, Ontario, Canada, a corporation
Filed Sept. 3, 1959, Ser. No. 837,867
13 Claims. (Cl. 154—2.27)

This invention relates to a method of applying an extruded plastic waterproof sheath to elongated, continuous rod-like members and, in particular, to metal-clad electric power transmission cables.

In the following specification and in the drawings the invention will be illustrated with reference to such electric power transmission cables but it is expressly intended that the scope of the claims be construed to include other base members for the extruded sheath such as telephone and telegraph cables, pipes and other similar elements which may be broadly included in the definition "elongated, continuous, rod-like members."

In the electric power transmission cable art particularly, it is desirable, in certain circumstances, to extrude over the metal-cladding of the power transmission cable a plastic sheath or jacket which will be waterproof and which will, accordingly, prevent water from gaining access to the metal-cladding of the cable and which will, therefore, inhibit and prevent corrosion of the metal-cladding.

A material which is particularly suitable for use as the extruded plastic waterproof sheath is polyvinylchloride but this material will not adhere, of itself, to the metal-cladding. Accordingly, if a polyvinylchloride sheathed metal-clad cable is immersed in water and the polyvinylchloride sheath should become punctured, water will gain access to the metal-cladding and due to the fact that there is no bond between the sheath and cladding, water will migrate along the cable between the sheath and metal-cladding and may cause corrosive damage to the metal-cladding over an extended area, on both sides of the initial puncture.

This is clearly an undesirable situation but attempts to adhere the polyvinyl sheath to the metal-cladding have, until the time of the present invention, been unsuccessful.

If the metal-cladding is coated with an adhesive before the polyvinylchloride sheath is extruded on it, the extruding process which is carried out under an elevated temperature will cause the relatively volatile adhesive (e.g. polyisobutylene) to vapourize and blisters will be formed in the soft sheath immediately downstream from the extruding nozzle. These blisters are, of course, unacceptable since they seriously weaken the sheath and render it more likely to be punctured by obstructions which the cable may encounter during the laying operation and its service life.

Accordingly, since the polyvinylchloride sheath will not adhere of itself to the metal-cladding and since it cannot be adhered by an adhesive medium during the extruding operation, the present invention was evolved which has as its object the provision of an intermediate layer between the metal-cladding and the extruded polyvinylchloride sheath which will adhere to the metal-cladding and to the extruded sheath and cause a secure mechanical bond to exist between the metal-cladding and the extruded polyvinylchloride sheath.

Figure 2:
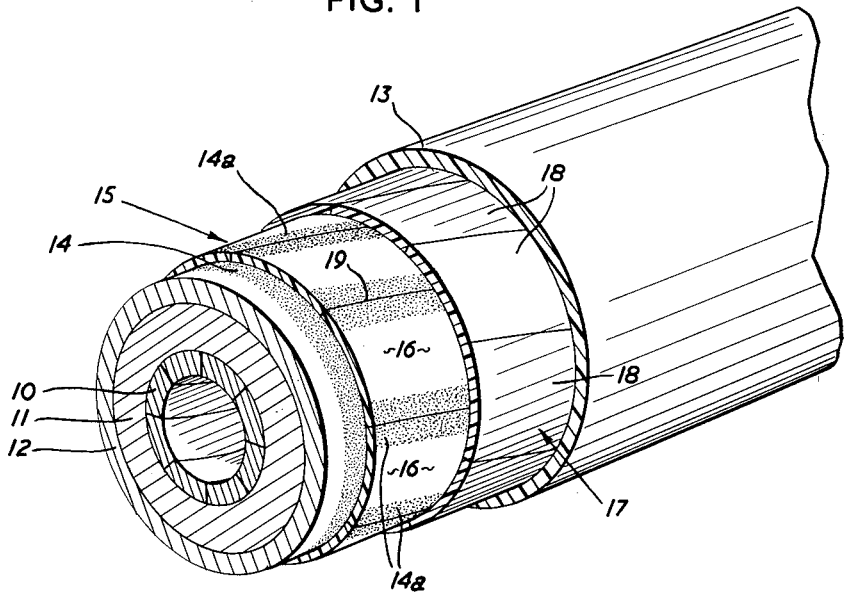
Figure 3:
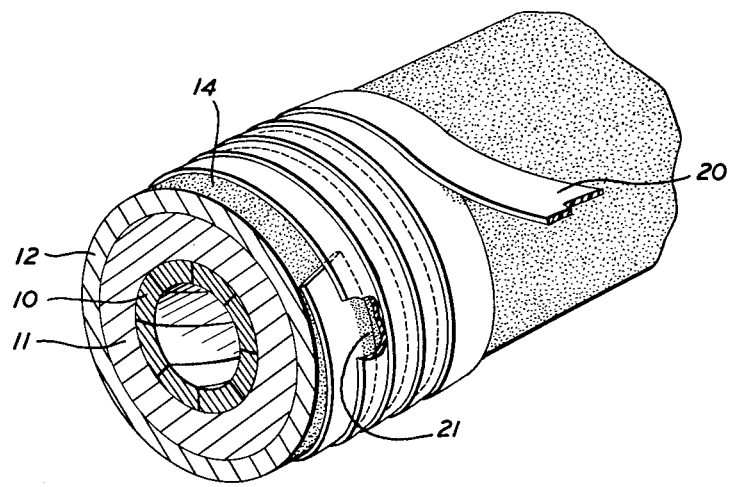
Figure 4:
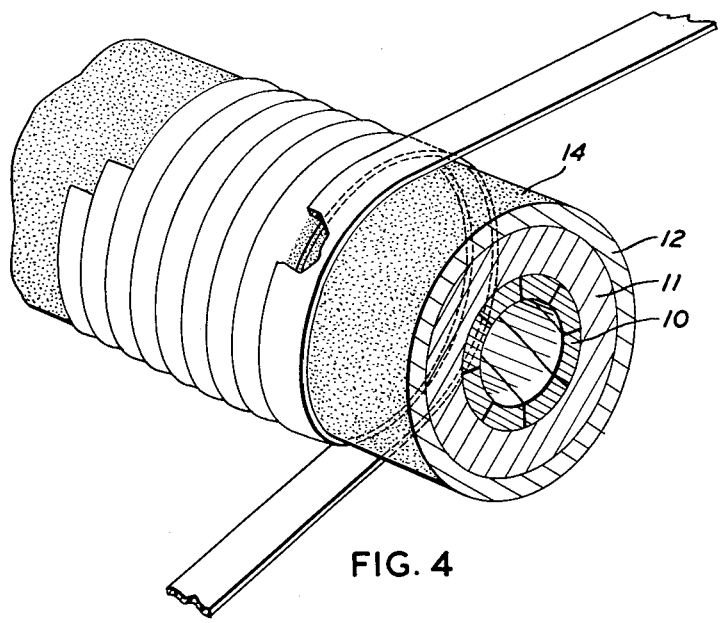

The invention will be described in detail with respect to a metal-clad electric power transmission cable by reference to the accompanying drawings illustrating the invention applied to such cable and in which:

Figure 1 is a transverse section through an electric power cable embodying one form of the invention and having the extruded polyvinylchloride sheath, Figure 2 is a perspective view of the cable of Figure 1 partially cut away to show the various layers, Figure 3 is a view similar to Figure 2 of a second embodiment of the invention, and Figure 4 is a view similar to Figure 2 showing a third embodiment of the invention.

Referring now to Figures 1 and 2 of the drawings the cable will be seen to comprise a conventional conductor 10 about which is provided an insulating layer 11 which, in turn, is surrounded by a layer of metal-cladding 12. This metal-cladding may conveniently take the form of an extruded lead sheath.

In order to securely bond the outer polyvinylchloride sheath 13 to the exterior surface of the metal-cladding 12 according to one embodiment of the invention, the metal-cladding 12 is first coated over its entire surface with an adhesive material 14, which, conveniently, may be coumarone-indene resin. Over this adhesive coating there is wound a first layer indicated generally by the reference character 15 of plastic material such as polyvinylchloride which is applied in strip form, the individual strips 16 being helically wound about the metal-cladding with their adjacent edges in close proximity to one another. No particular attempt is made to have the adjacent edges of adjacent strips 16 tightly abutting one another, it being preferred that there be a slight gap between adjacent strips so that the excess adhesive 14 applied to the metal-cladding may extrude and ooze through the space between adjacent strips 16 to lie on the external surface of these strips as indicated at 14a in Figure 2.

Subsequently, a second layer indicated by reference character 17 of plastic material such as polyvinylchloride is applied in a manner identical to that which has just been described with respect to the first layer 15. Individual strips 18 of plastic material are helically wound about the cable in such a manner that each strip 18 overlies the joint 19 between adjacent strips 16 of the first layer. The strips 18 of the second layer 17 are adhered to the first layer by means of the excess adhesive 14a which has oozed through the joints 19 in the first layer, the amount of adhesive initially applied being sufficient to cause this oozing outwardly of the adhesive between the adjacent edges of the tapes in the first layer but insufficient to cause adhesive to ooze outwardly between the adjacent edges of the convolutions of the tapes in the second layer thereby providing a dry, adhesive free external surface of plastic material on the second layer which second layer is firmly adhered and bonded to the metal-cladding 12 through the medium of the first layer 15 and the adhesive 14.

Subsequent to the application of this second layer 17 the polyvinylchloride sheath 13 may be extruded over the cable in a conventional manner, the heat of extrusion causing the extruded sheath 13 to fuse and become intimately bonded to the second layer 17 so that the sheath 13 is securely and intimately bonded to the metal-cladding 12 through the medium of the second layer, the first layer and the adhesive.

Alternative methods are illustrated in Figures 3 and 4. In Figure 3 a single tape 20 of polyvinylchloride is wound in a closely pitched helix about the adhesive coated metal-clad cable, the helix being so wound that each convolution overlaps approximately one-half the width of the polyvinylchloride tape of the previous convolution. In other words, the pitch of the helix is equal to approximately one-half the width of the polyvinylchloride tape. By this construction the external surface of the tape will be perfectly dry and free from adhesive and the tape will be firmly bonded to the metal-cladding through the medium of the adhesive so as to provide a firm base over which the final polyvinylchloride sheath may be extruded. It will be seen, at 21 that the adhesive 14 which is first coated on the metal-cladding 12, will, as each convolution is formed, ooze out from beneath that portion of each convolution which is in direct contact with the adhesive coated sheath 12 and will flow onto the external surface of the tape of the previous convolution over a distance sufficient to bond each convolution to the preceding convolution but not sufficiently far to lie exposed on the external surface of the polyvinylchloride tapes. A relatively close contol of the quantity of adhesive applied must be maintained but conventional coating techniques are capable of performing this operation without difficulty.

Referring now to Figure 4 it may be seen that instead of winding a single tape in closely spaced convolutions of a helix about the adhesive coated, metal-clad cable it is possible to wind two tapes or even more tapes in an intercalated fashion over the adhesive coated metal-cladding in a manner which is commonly understood in the trade. Conventional wrapping machines may be employed for the purpose and, once again, the quantity of adhesive should be closely controlled so that no excess adhesive will ooze outwardly between adjacent convolutions to contaminate the external surface of the tape wrapping.

From the above description of the method by which the polyvinylchloride sheath is applied it will be apparent that a simple, quick and efficient method has been devised whereby the problem of adhering the plastic sheath to the metal-cladding has been overcome. In the event that the plastic sheath is punctured, the moisture cannot migrate along the cable since the intimate bond between the extruded sheath and the second layer 17 will confine the moisture gaining access to the cable to the area immediately adjacent the puncture. Similarly, the method described above eliminates the blistering and bubbling problem which was encountered when it was attempted to extrude the polyvinyl sheath onto an adhesive coated metal-clad cable.

While the invention has been described in detail with respect to a preferred embodiment it is intended that the claims protect the invention in its broad sense and minor modifications are contemplated within the scope of the appended claims.

What I claim as my invention is:

1. The method of applying an extruded water-proof plastic sheath to an elongated, continuous rod-like member which has an outer surface to which the plastic sheath will not fuse, comprising the steps of coating a member with an adhesive material, applying a layer of plastic material in strip form over the member so as to adhere the layer to the member while maintaining the external surface of the layer free from contamination by adhesive and subsequently extruding, under elevated temperature, a plastic sheath over the said layer, the heat of extrusion causing the extruded sheath to fuse to the said layer and thereby be bonded to the surface of the member through the medium of the layer and the adhesive.

2. The method of claim 1 wherein the layer comprises a closely wound helix of plastic tape, each convolution of the helix partially overlapping the previous convolution.

3. The method of claim 1 wherein the pitch of the helix is approximately equal to one-half of the width of the strip.

4. The method of claim 1 wherein a plurality of tapes are wound helically about the adhesive coated member in intercalated fashion.

5. The method of claim 1 wherein the quantity of adhesive initially applied to the member is sufficient to adhere the plastic tapes to the member but insufficient to permit the adhesive to ooze out between adjacent convolutions to contaminate the external surface thereof.

6. The method of applying an extruded water-proof sheath to an elongated, continuous rod-like member which has an outer surface to which the sheath will not fuse, comprising the steps of coating the surface of the member with an adhesive material, applying a first layer of plastic over the adhesive to be thereby adhered to the surface of the member by helically winding at least one tape of plastic material about the surface of the member with the edges of adjacent convolutions of the tape in close proximity to one another, then applying a second layer of plastic over the first layer by helically winding at least one tape of plastic material about the first layer with the tape of the second layer lying over the adjacent edges of two adjacent convolutions of the tape of the first layer, the quantity of adhesive initially applied being sufficient to cause oozing outwardly of the adhesive between the adjacent edges of the tape in the first layer to adhere the tape of the second layer to the tape of the first layer but insufficient to cause adhesive to ooze outwardly between the adjacent edges of the convolutions of the tape in the second layer; and subsequently extruding under elevated temperature, a plastic sheath over the second layer, the heat of extrusion causing the extruded sheath to fuse to the plastic tapes of the second layer and to thereby be bonded to the surface of the member through the medium of the first layer and the adhesive.

7. The method of applying an extruded waterproof sheath to an elongated continuous rod-like member which has an outer surface to which the sheath will not fuse comprising the steps of coating the surface of the member with an adhesive material, applying a first layer of plastic over the adhesive to be thereby adhered to the surface of the member by helically winding at least one tape of plastic material about the surface of the member with the edges of adjacent convolutions of the tape in close proximity to one another, then applying a second layer of plastic over the first layer by helically winding at least one tape of plastic material of a width substantially equal to the width of the tape of the first layer about the first layer with the tape of the second layer lying over the adjacent edges of two adjacent convolutions of the tape of the first layer, the quantity of adhesive initially applied being sufficient to cause oozing outwardly of the adhesive between the adjacent edges of the tape in the first layer to adhere the tape of the second layer to the tape of the first layer but insufficient to cause adhesive to ooze outwardly between the adjacent edges of the convolutions of the tape in the second layer; and subsequently extruding under elevated temperature, a plastic sheath over the second layer, the heat of extrusion causing the extruded sheath to fuse to the plastic tapes of the second layer and to thereby be bonded to the surface of the member through the medium of the first layer and the adhesive.

8. The method of applying an extruded waterproof sheath to an elongated continuous rod-like member which has an outer surface to which the sheath will not fuse comprising the steps of coating the surface of the member with an adhesive material, applying a first layer of plastic over the adhesive to be thereby adhered to the surface of the member by helically winding at least one tape of plastic material about the surface of the member with the edges of adjacent convolutions of the tape in close proximity to one another, then applying a second layer of plastic over the first layer by helically winding at least one tape of plastic material of a width substantially equal to the width of the tape of the first layer about the first layer with the centre line of the tape of the second layer lying between the adjacent edges of two adjacent convolutions of the tape of the first layer, the quantity of adhesive initially applied being sufficient to cause oozing outwardly of the adhesive between the adjacent edges of the tape in the first layer to adhere the tape of the second layer to the tape of the first layer but insufficient to cause adhesive to ooze outwardly between the adjacent edges of the convolutions of the tape in the second layer; and subsequently extruding under elevated temperature, a plastic sheath over the second layer, the heat of extrusion causing the extruded sheath to fuse to the plastic tapes of the second layer and to thereby be bonded to the surface of the member through the medium of the first layer and the adhesive.

9. The method of applying an extruded plastic waterproof sheath to a metal-clad electric power transmission cable comprising the steps of coating the metal-cladding of the cable with an adhesive material, applying a first layer of plastic over the adhesive to be thereby adhered to the metal-cladding by helically winding at least one tape of plastic material about the cable with the edges of adjacent convolutions of the tape in close proximity to one another, then applying a second layer of plastic over the first layer by helically winding at least one tape of plastic material about the first layer with the tape of the second layer lying over the adjacent edges of two adjacent convolutions of the tape of the first layer, the quantity of adhesive initially applied being sufficient to cause oozing outwardly of the adhesive between the adjacent edges of the tape in the first layer to adhere the tape of the second layer to the tape of the first layer but insufficient to cause adhesive to ooze outwardly between the adjacent edges of the convolutions of the tape in the second layer; and subsequently extruding under elevated temperature, a plastic sheath over the second layer, the heat of extrusion causing the extruded sheath to fuse to the plastic tape of the second layer and to thereby be bonded to the metal-cladding through the medium of the first layer and the adhesive.

10. The method of applying an extruded plastic waterproof sheath to a metal-clad electric power transmission cable comprising the steps of coating the metal-cladding of the cable with an adhesive material, applying a first layer of plastic over the adhesive to be thereby adhered to the metal-cladding by helically winding at least one tape of plastic material about the cable with the edges of adjacent convolutions of the tape in close proximity to one another, then applying a second layer of plastic over the first layer by helically winding at least one tape of plastic material of a width substantially equal to the width of the tape of the first layer about the first layer with the tape of the second layer lying over the adjacent edges of two adjacent convolutions of the tape of the first layer, the quantity of adhesive initially applied being sufficient to cause oozing outwardly of the adhesive between the adjacent edges of the tape in the first layer to adhere the tape of the second layer to the tape of the first layer but insufficient to cause adhesive to ooze outwardly between the adjacent edges of the convolutions of the tape in the second layer; and subsequently extruding under elevated temperature, a plastic sheath over the second layer, the heat of extrusion causing the extruded sheath to fuse to the plastic tape of the second layer and to thereby be bonded to the metal-cladding through the medium of the first layer and the adhesive.

11. The method of applying an extruded plastic waterproof sheath to a metal-clad electric power transmission cable comprising the steps of coating the metal-cladding of the cable with an adhesive material, applying a first layer of plastic over the adhesive to be thereby adhered to the metal-cladding by helically winding at least one tape of plastic material about the cable with the edges of adjacent convolutions of the tape in close proximity to one another, then applying a second layer of plastic over the first layer by helically winding at least one tape of plastic material of a width substantially equal to the width of the tape of the first layer about the first layer with the centre line of the tape of the second layer lying between the adjacent edges of two adjacent convolutions of the tape of the first layer, the quantity of adhesive initially applied being sufficient to cause oozing outwardly of the adhesive between the adjacent edges of the tape in the first layer to adhere the tape of the second layer to the tape of the first layer but insufficien to cause adhesive to ooze outwardly between the adjacent edges of the convolutions of the tape in the second layer; and subsequently extruding under elevated temperature, a plastic sheath over the second layer, the heat of extrusion causing the extruded sheath to fuse to the plastic tape of the second layer and to thereby be bonded to the metal-cladding through the medium of the first layer and the adhesive.

12. The method of claim 1, in which the adhesive is coumarone-indene resin and the plastic is polyvinylchloride.

13. The method of claim 1, in which the adhesive is coumarone-indene resin and the plastic is polyvinylchloride.

References Cited in the file of this patent

UNITED STATES PATENTS

| | | |
|---|---|---|
| 2,403,077 | Hershberger | July 2, 1946 |
| 2,631,186 | Bondon | Mar. 10, 1953 |